(12) United States Patent
Cardon et al.

(10) Patent No.: US 12,065,867 B2
(45) Date of Patent: Aug. 20, 2024

(54) ACTUATOR FOR OPENING AND CLOSING A DOOR OR A TAILGATE OF A CAR

(71) Applicant: NV Bekaert SA, Zwevegem (BE)

(72) Inventors: Olivier Cardon, De Pinte (BE); Vincent Vermeersch, Ghent (BE); Johan Van De Velde, Lochristi (BE); Pieter Ghekiere, Helkijn (BE); Wim Van Haver, Aalter (BE)

(73) Assignee: NV BEKAERT SA, Zwevegem (BE)

(*) Notice: Subject to any disclaimer, the term of this patent is extended or adjusted under 35 U.S.C. 154(b) by 456 days.

(21) Appl. No.: 17/417,942

(22) PCT Filed: Jan. 29, 2020

(86) PCT No.: PCT/EP2020/052133
§ 371 (c)(1),
(2) Date: Jun. 24, 2021

(87) PCT Pub. No.: WO2020/173648
PCT Pub. Date: Sep. 3, 2020

(65) Prior Publication Data
US 2022/0025691 A1 Jan. 27, 2022

(30) Foreign Application Priority Data
Feb. 26, 2019 (EP) .................................. 19159435

(51) Int. Cl.
*E05F 15/616* (2015.01)
*C22C 38/02* (2006.01)
(Continued)

(52) U.S. Cl.
CPC ............ *E05F 15/616* (2015.01); *C22C 38/02* (2013.01); *C22C 38/04* (2013.01); *C22C 38/06* (2013.01);
(Continued)

(58) Field of Classification Search
CPC ..... E05F 15/616; E05F 1/1058; E05F 15/622; C22C 38/02; C22C 38/04; C22C 38/06;
(Continued)

(56) References Cited

U.S. PATENT DOCUMENTS

2003/0024610 A1* 2/2003 Ibakaki ................... C22C 38/46
420/104
2005/0123786 A1* 6/2005 Honda ...................... C23C 2/12
428/650
(Continued)

FOREIGN PATENT DOCUMENTS

DE 20 2004 015 535 12/2004
JP H0670268 B2 * 9/1994
(Continued)

OTHER PUBLICATIONS

International Search Report and Written Opinion of the International Searching Authority issued Jul. 30, 2020, in International (PCT) Application No. PCT/EP2020/052133.

*Primary Examiner* — Kristina R Fulton
*Assistant Examiner* — Jock Wong
(74) *Attorney, Agent, or Firm* — Wenderoth, Lind & Ponack, L.L.P.

(57) ABSTRACT

An actuator for opening and closing a door or a tailgate of a car contains a helical compression spring and a motor. The helical compression spring is provided for opening a door or the tailgate of a car when compressive forces of the helical compression spring are released. The motor is provided for compressing the helical compression spring in order to close the door or the tailgate of the car. The helical compression spring contains a helically coiled coated steel wire. The helically coiled coated steel wire contains a steel core and a metallic coating layer. The steel core contains a steel alloy. The steel alloy contains 0.8 to 0.95 wt % carbon, 0.2 to 0.9 wt % manganese; 0.1 to 1.4 wt % silicon; optionally one or (Continued)

more micro-alloying element. The microstructure of the steel core is drawn lamellar pearlite. The metallic coating layer contains at least 84% by mass of zinc.

19 Claims, 2 Drawing Sheets

(51) Int. Cl.
    *C22C 38/04*     (2006.01)
    *C22C 38/06*     (2006.01)
    *C22C 38/24*     (2006.01)
    *F16F 1/02*     (2006.01)
    *F16F 1/06*     (2006.01)

(52) U.S. Cl.
    CPC .............. *C22C 38/24* (2013.01); *F16F 1/06* (2013.01); *E05Y 2800/674* (2013.01); *E05Y 2900/531* (2013.01); *E05Y 2900/532* (2013.01); *E05Y 2900/546* (2013.01); *F16F 1/021* (2013.01); *F16F 2224/0208* (2013.01); *F16F 2238/026* (2013.01)

(58) Field of Classification Search
    CPC ... C22C 38/24; F16F 1/06; F16F 1/021; F16F 2224/0208; F16F 2238/026; F16F 1/024; F16F 2226/00; E05Y 2800/674; E05Y 2800/29; E05Y 2800/67; E05Y 2800/68; E05Y 2900/531; E05Y 2900/532; E05Y 2900/546; C21D 2211/009; C23C 2/06; C23C 28/023; C23C 28/025

USPC ................ 16/72; 148/580; 428/378, 389
See application file for complete search history.

(56) References Cited

U.S. PATENT DOCUMENTS

| | | | |
|---|---|---|---|
| 2010/0126643 A1* | 5/2010 | Yamasaski | C21D 9/525 148/330 |
| 2012/0014831 A1* | 1/2012 | Yamasaki | C21D 9/52 420/104 |
| 2012/0070687 A1* | 3/2012 | Shimoda | C22C 38/18 72/40 |
| 2013/0127100 A1 | 5/2013 | Ishida et al. | |
| 2015/0167112 A1* | 6/2015 | Sakamoto | F16C 33/34 148/333 |
| 2017/0114580 A1 | 4/2017 | Dietzel | |
| 2018/0216391 A1 | 8/2018 | Takizawa et al. | |
| 2018/0327889 A1* | 11/2018 | Teshima | C22C 38/00 |

FOREIGN PATENT DOCUMENTS

| | | | | |
|---|---|---|---|---|
| JP | 2008261028 A | * | 10/2008 | |
| KR | 20120051093 A | * | 5/2012 | |
| KR | 20130071129 A | * | 6/2013 | |
| WO | 97/42352 | | 11/1997 | |
| WO | WO-2017012958 A1 | * | 1/2017 | ........... B32B 15/013 |
| WO | WO-2017212770 A1 | * | 12/2017 | ............. B21F 35/00 |
| WO | 2018/179597 | | 10/2018 | |

* cited by examiner

ACTUATOR FOR OPENING AND CLOSING A DOOR OR A TAILGATE OF A CAR

TECHNICAL FIELD

The invention relates to an actuator for opening and closing a door or a tailgate of a car. The actuator comprises a motor and a steel wire helical compression spring.

BACKGROUND ART

SUVs (Sports Utility Vehicles) know increased popularity. SUVs have a large—and thus heavy—tailgate. It is known to use helical compression steel springs in the actuators to open and close the tailgate of such SUVs.

There is an increased tendency to use motor operated tailgate opening and closing actuators. US2018/0216391A1 and US2017/0114580A1 disclose such actuators.

In such typical actuators, the tailgate is opened by releasing the forces of a helical steel wire spring operating in compression mode. The tailgate is closed by the operation of a motor; whereby the motor compresses the helical steel wire spring. The helical steel wire spring for such applications has to meet very stringent requirements. According to a first requirement, the helical spring must have a small diameter, in order to make the actuator for opening and closing the tailgate as compact as possible. The spring must be able to withstand the high compressive forces in a consistent way. Relaxation of the spring must be low, as spring relaxation modifies the spring forces for a given compression, which would be negative for the operation of the tailgate opening and closing actuator. Furthermore, the spring must have sufficient fatigue resistance, in that it must survive the required number of opening and closing cycles of the tailgate at high load of the spring. Because of the size of the tailgates of SUVs, the springs used have a long length.

It is known to use steel wires having a martensitic microstructure for producing helical springs for tailgate opening and closing actuators of cars. Steel wires having a martensitic microstructure are typically manufactured by hardening and tempering heat treatment operations.

DE202004015535U1 describes a tailgate opening and closing system of a car. The system comprises a helical steel wire spring. The spring is made from a steel wire having a diameter of at least 1 mm. The steel alloy out of which the steel wire is made comprises 0.5-0.9% by weight of carbon, 1-2.5% by weight of silicon, 0.3-1.5% manganese, 0.5-1.5% by weight of chromium, iron and impurities. The steel alloy optionally comprises 0.05-0.3% by weight of vanadium and/or 0.5-0.3% by weight of niobium and/or tantalum. The steel wire is made via a patenting operation followed by wire drawing. The steel wire is then hardened and tempered to obtain a martensitic microstructure, a tensile strength higher than 2300 N/mm$^2$ and a reduction of the cross sectional area at break of more than 40%. The obtained steel wire is cold formed into a helical spring, which is then stress relieved at a temperature between 200° C. and 400° C. The spring can be shot peened to increase its durability.

Helical springs exist that are made with hard drawn steel wire. European Standard EN 10270-1:2011 is entitled "Steel wire for mechanical springs—Part 1: Patented cold drawn unalloyed spring steel wire". Although the title refers to unalloyed spring steel wire, section 6.1.2 of the standard indicates that the addition of micro-alloying elements may be agreed between the manufacturer and the purchaser. The standard differentiates steel spring wire in two ways. The first way is according to static duty (S) or dynamic duty (D). The second way is according to tensile strength, low (L), medium (M) or high (H). The two ways combined provide 5 grades of spring steel wire (SL, SM, DM, SH and DH) for which the mechanical properties (among which the tensile strength Rm) and quality requirements are given in Table 3 of standard EN 10270-1:2011 as a function of the steel wire diameter. As an example, for steel wire of diameter between 3.8 and 4 mm, the tensile strength Rm for grade DH (the grade which has the highest specified tensile strength) needs to be between 1740 and 1930 MPa.

To avoid noise issued by the actuator when driving the car, it is common practice that the helical compression springs are flocked. A layer of short textile fibers, e.g. polyamide fibers, are bonded by means of an adhesive layer onto the helical compression spring, after coiling of the spring. This way, a velvet layer is created that acts as noise dampening on the tightly compressed spring in the actuator.

DISCLOSURE OF INVENTION

The invention relates to an actuator for opening and closing a door or a tailgate of a car. The actuator comprises a helical compression spring and a motor. The helical compression spring is provided for opening a door or the tailgate of a car when compressive forces of the helical compression spring are released. The motor is provided for compressing the helical compression spring in order to close the door or the tailgate of the car. The helical compression spring comprises a helically coiled coated steel wire. The helically coiled coated steel wire comprises a steel core and a metallic coating layer. Preferably, the diameter d (in mm) of the helically coiled coated steel wire is between 2 and 5 mm. The steel core comprises a steel alloy. The steel alloy comprises—and preferably consists out of—between 0.8 and 0.95 wt % carbon, between 0.2 and 0.9 wt % manganese; between 0.1 and 1.4 wt % silicon; optionally one or more than one of the micro-alloying elements chromium, vanadium, tungsten, molybdenum, niobium or boron; optionally aluminum; unavoidable impurities; and iron. The microstructure of the steel core is drawn lamellar pearlite. The metallic coating layer comprises at least 84% by mass of zinc; and preferably aluminum.

It is a benefit of the invention that an actuator is obtained which satisfies all requirements in terms of mechanical properties, lifetime and noise prevention in the actuator. Martensitic steel wires are used today in helical compression springs for actuators for opening and closing tailgates; the springs are post-coated and provided with a flock layer. Post-coating operations are normally performed to achieve a level of corrosion resistance as typically required in automotive applications. The steel wires required for actuators for opening and closing doors or tailgates of cars preferably have a diameter between 2 and 5 mm and must have a high strength and sufficient ductility. Hardened and tempered steel wires (which have a martensitic microstructure) of these diameters have highest strength. Helically coiled springs made with such hardened and tempered steel wires and having been subjected to the standard post treatment (e.g. stress relieving, shot peening, post coating and flocking) provide the combination of excellent fatigue life, low relaxation of the spring force, lifetime and noise attenuation. Because of the high demands for springs for actuators for opening and closing tailgates (high compressive forces, low relaxation allowed, fatigue life requirements, life time requirements, no noise generation) which match perfectly with the known properties of martensitic steel wires (and the processes performed on the helically coiled compression spring made from the martensitic steel wire), the skilled person has a technical prejudice to use martensitic steel wires and not to use hard drawn wires (hard drawn wires have a drawn pearlitic microstructure) for the production of helical compression springs for actuators for opening and closing tailgates. The steel alloys selected in the invention surprisingly provide coated steel wires with drawn pearlitic microstructure which have the combination of steel wire properties (strength, yield strength, ductility) required to obtain helical compression springs that satisfy the demanding requirements for use in actuators for opening and closing a door or a tailgate of a car. Furthermore, there is no need for a post-coating operation and no need for providing a flock layer on the helical compression spring. The metallic coating layer provides sufficient noise prevention such that no noise is created by the helical compression spring in the actuator when driving the car. The metallic coating layer also provides the required lifetime to the helical compression spring in the actuator; and therefore to the actuator.

In a preferred actuator, the metallic coating layer provides the surface of the helical compression spring.

Preferably, the actuator comprises two connectors, one for connecting the actuator to the door or to the tailgate; and the other one for connecting the actuator to the body of the car.

Preferably, the steel alloy comprises at least one or more than one of the micro-alloying elements vanadium, tungsten, molybdenum, niobium in individual quantities between 0.04 and 0.2 wt %; and/or comprises chromium in quantities between 0.15 and 0.4 wt %; and/or comprises between 0.0005 and 0.008 wt % boron.

Preferably, the steel alloy comprises between 0.02 and 0.06 wt % aluminum. Such embodiments provide better helical compression springs thanks to the higher ductility of the coated steel wire used to manufacture the helical compression spring.

In preferred embodiments, the steel alloy has a carbon equivalent higher than 1. The carbon equivalent is defined as: C wt %+(Mn wt %/6)+(Si wt %/5)+(Cr wt %/5)+(V wt %/5)+(Wwt %/5)+(Mo wt %/5)+(Nb wt %/5). More preferably, the steel alloy has a carbon equivalent higher than 1.05; more preferably higher than 1.1. More preferably, the steel alloy has a carbon equivalent below 1.4, more preferably below 1.3.

Preferably, the carbon content of the steel alloy is less than 0.93 wt %, more preferably less than 0.9 wt %.

In a preferred embodiments, the steel alloy comprises between 0.15 and 0.4 wt % Cr (more preferably, the steel alloy comprises less than 0.35 wt % Cr, even more preferably less than 0.3 wt % Cr); and optionally between 0.04 and 0.2 wt % V.

When the steel alloy comprises V, preferably the steel alloy comprises less than 0.15 wt % V.

Preferably, the helical compression spring has an outer diameter less than 40 mm.

Preferably, the helical compression spring has a length in unloaded condition of more than 40 cm. More preferably of more than 60 cm.

Preferably, the length of the helical compression spring in unloaded condition is less than 1000 mm.

Preferably, the helical compression spring has a spring index between 3 and 8. The spring index is the ratio of the diameter of the spring (wherein the diameter of the spring for calculating the spring index is the average between the outer diameter and the inner diameter of the spring in unloaded condition) over the diameter of the steel wire of the spring.

Preferably, the diameter of the coated steel wire is between 2 and 4 mm, more preferably between 2.5 and 3.8 mm.

Preferably, the helical compression spring has a pitch angle between 5 and 10°. Such helical compression springs can be beneficially used in tailgate opening and closing actuators of cars.

Preferably, the coated steel wire used for helically coiling the helical compression spring has a tensile strength $R_m$ (in MPa) higher than the value calculated by the formula 2680-390.71*In(d). More preferably, the tensile strength $R_m$ (in MPa) of the coated steel wire is higher than the value calculated by the formula 2720-390.71*In(d); more preferably higher than the value calculated by the formula 2770-390.71*In(d); and even more preferably higher than the value calculated by the formula 2800-390.71*In(d). With the function "In(d)" is meant the natural logarithm of the diameter d (in mm) of the coated steel wire. The tensile test to measure the mechanical properties of the steel wires is conducted according to ISO 6892-1:2009 entitled "Metallic materials—Tensile testing—Part 1: Method of test at room temperature".

Preferably, the percentage reduction of area Z at break in tensile testing of the coated steel wire used for the production of the helical compression spring is more than 40%. The percentage reduction of area Z is calculated as: $Z=100*(S_o-S_u)/S_o$, $S_o$ being the original cross section of the coated steel wire before starting tensile testing and $S_u$ being the smallest cross section of the coated steel wire after fracture in tensile testing.

Preferably, the steel alloy comprises between 0.3 and 0.6 wt % Mn; or the steel alloy comprises between 0.6 and 0.9 wt % Mn.

Preferably the steel core comprises in the spring at least 95%—and more preferably at least 97%—by volume of drawn lamellar pearlite.

In a preferred embodiment, the volume percentage of bainite in the microstructure of the steel core is between 0.2% and 2%, preferably below 0.5%. Such embodiments have surprisingly shown to be particularly beneficial for the invention. When the microstructure comprises such amounts of bainite, it is an indication that the lamellar pearlite is very fine, favorable to achieve optimum spring coiling and excellent mechanical spring properties, without the bainite creating negative effects. The limited amount of bainite is important for the ductility of the coated steel wire. The low amount of bainite can be achieved by a proper patenting operation in the production process of the steel core. The volume percentage bainite in the microstructure of the steel core of the coated steel wire can be determined via optical microscopy or scanning electron microscopy using an appropriate etchant.

Optionally, the metallic coating layer comprises other active elements, each in individual quantities of less than 1% by weight.

Preferably, the mass of the metallic coating layer is less than 120 g/m², more preferably between 20 and 80 g/m², more preferably less than 60 g/m² of the surface of the helical compression spring, even more preferably less than 40 g/m² of the surface of the helical compression spring.

Preferably, the metallic coating comprises at least 88 wt % of zinc, more preferably at least 90 wt % of zinc. More preferably, the metallic coating layer comprises at least 93 wt % of zinc.

Preferably, the metallic coating comprises—and preferably consists out of—zinc, at least 4% by weight of alumi num—and preferably less than 14% by weight of aluminum —; optionally between 0.2 and 2 wt % magnesium (and preferably less than 0.8 wt % Mg); optionally up to 0.6 wt % silicon; optionally up to 0.1 wt % rare earth elements, and unavoidable impurities.

Preferably, the metallic coating layer comprises—and preferably consists out of—between 86 and 92 wt % Zn and between 14 and 8 wt % Al; and unavoidable impurities. Preferably, such metallic coating layer has a mass between 35 and 60 g/m². It is a particular benefit that such metallic coating layer can be made thin while still having good corrosion protection properties. A thin coating layer also facilitates coiling of the helical compression spring.

Preferably, the metallic coating layer consists out of zinc, between 3 and 8 wt % aluminum; optionally up to 0.1 wt % rare earth elements; and unavoidable impurities. Preferably, such metallic coating layer has a mass between 60 and 120 g/m².

Preferably, the metallic coating layer consists out of zinc, between 3 and 8 wt % aluminum; between 0.2-2 wt (and preferably less than 0.8 wt %) magnesium; and unavoidable impurities. It is a particular benefit that such metallic coating layer can be made thin while still having good corrosion protection properties. A thin coating layer also facilitates coiling of the helical compression spring. Such metallic coating layer can e.g. be less than 60 g/m². Preferably between 25 and 60 g/m².

Preferably, the metallic coating layer comprises a globularized aluminum rich phase. Such globularized aluminum rich phase is created in drawing as the coated steel wire is heated by the drawing energy; and even to a larger extent when a stress relieving heat treatment is performed on the helical compression spring after coiling it. It is believed that the globularized aluminum rich phase improves the corrosion resistance of the metallic helical compression spring; such that a thinner metallic coating layer can be used.

Preferably, the coated steel wire comprises an intermetallic coating layer provided between the steel core and the metallic coating layer. The intermetallic coating layer comprises an $Fe_xAl_y$ phase. More preferably the intermetallic coating layer provides between 30 and 65% of the combined thickness of the intermetallic coating layer and the metallic coating layer. The intermetallic layer is beneficial as it creates the required adhesion of the metallic coating layer, in order to allow the steel wire to be coiled into a helical compression spring without damage to the metallic coating layer. A thinner intermetallic coating layer risks to provide flaking when coiling the spring; a thicker coating risks that coilability is not good. The intermetallic coating layer comprising an $Fe_xAl_y$ phase is obtained when applying the double dip process to apply the metallic coating layer onto a steel core. A first dip is performed in a zinc bath. A $Fe_xZn_y$ layer is formed on the steel surface. The second dip is performed in a bath comprising Zn and Al. In the second bath, the $Fe_xZn_y$ layer formed in the first bath is converted to an intermetallic coating layer comprising an $Fe_xAl_y$ phase.

Preferably, the coated steel wire comprises an inhibition layer. The inhibition layer is provided between the steel core and the metallic coating layer. The inhibition layer is provided by an $Fe_xAl_y$ phase. Preferably, the inhibition layer is less than 1 μm thick. A coated steel wire with such inhibition layer can be obtained by using a single dip process to apply the metallic coating layer. The steel surface is activated, e.g. via the Sendzimir process, and the steel wire is immersed in a bath comprising molten Zn and Al. The steel wire is wiped after immersion in the bath and cooled.

In a preferred embodiment, the metallic coating layer consists out of zinc and unavoidable impurities. More preferably the mass of the metallic coating layer is more than 80 g/m², more preferably more than 100 g/m².

In preferred embodiments, the steel alloy comprises between 0.15 and 0.35 wt % Si, or the steel alloy comprises between 0.6 and 0.8 wt % Si, or the steel alloy comprises between 0.8 and 1.4 wt % Si.

In more preferred embodiments, the steel alloy comprises between 0.6 and 1.4 wt % Si; more preferably between 0.8 and 1.4 wt % Si. Such embodiments are particularly beneficial, as a coated steel wire with high strength can be obtained, as the high amount of Si prevents loss of strength of the steel wire in the hot dip process when applying the metallic coating in an intermediate step in the wire drawing process.

In a preferred embodiment, the steel alloy consists out of between 0.83 and 0.89 wt % C, between 0.55 and 0.7 wt % Mn, between 0.1 and 0.4 wt % Si, between 0.15 and 0.3 wt % Cr, between 0.04 and 0.08 wt % V, optionally between 0.02 and 0.06 wt % Al; and unavoidable impurities and the balance being iron.

In a preferred embodiment, the steel alloy consists out of between 0.83 and 0.89 wt % C, between 0.55 and 0.7 wt % Mn, between 0.55 and 0.85 wt % Si, between 0.15 and 0.3 wt % Cr, between 0.04 and 0.08 wt % V, optionally between 0.2 and 0.06 wt % Al; and unavoidable impurities and the balance being iron.

In a preferred embodiment, the steel alloy consists out of between 0.9 and 0.95 wt %% C, between 0.2 and 0.5 wt % Mn, between 1.1 and 1.3 wt % Si, between 0.15 and 0.3 wt % Cr; and unavoidable impurities and the balance being iron.

In a preferred embodiment, the helically coiled coated steel wire has a non-circular cross section, preferably a rectangular or square cross section. For embodiments wherein the cross section of the helically coiled coated steel wire is non-circular, the diameter of this steel wire is the equivalent diameter. The equivalent diameter is the diameter of a wire with circular cross section which has the same cross sectional area as the wire with non-circular cross section.

Preferably, the steel core of the coated steel wire in the helical compression spring has a drawing reduction of more than 75%. The wire rod from which the steel core has been drawn, or the steel core itself has undergone a patenting operation to create a pearlitic microstructure; followed by steel wire drawing operations. The drawing reduction (in %) is defined as $100*(A_0-A_1)/A_0$, wherein $A_0$ equals the area of the cross section of the wire rod or the steel core after patenting and before drawing; and $A_1$ the area of the cross section of the drawn steel core used to manufacture the spring. During the drawing deformation the pearlite grains will be oriented into longitudinal direction of the steel core. The level of orientation of the pearlite grains is determined by the drawing reduction of the steel core. The drawing reduction can be assessed from the evaluation of the drawn lamellar pearlite microstructure of the steel core of the coated steel wire in the helical compression spring, e.g. by means of light optical microscopy on a longitudinal section (i.e. along the longitudinal direction of the coated steel wire in the helical compression spring).

In a preferred embodiment, after 20000 compressive load cycles of the helical compression spring between 63% and 37% of its length in unloaded condition, the load loss at 63% of its length is less than 5% (and preferably less than 3%) compared to the load at 63% of its length at the first cycle.

A helical compression spring as used in the inventive actuator can be made according to a method comprising the steps of:
- providing a steel wire rod;
- patenting the steel wire rod or a steel wire drawn from the steel wire rod, in order to obtain a pearlitic microstructure;
- after the patenting operation; and before drawing or between drawing steps, applying a metallic coating on the steel wire rod or on the steel wire via hot dip, wherein the metallic coating comprises at least 84% by mass of zinc; and optionally aluminum;
- drawing, with drawing reduction more than 75%, the patented and metal coated steel wire rod having a pearlitic microstructure or the patented and metal coated steel wire having a pearlitic microstructure; thereby obtaining a metal coated steel wire the steel core of which having a drawn pearlitic microstructure, preferably with diameter d (in mm) between 2 and 5 mm;
- helically coiling the coated steel wire into a helical spring;
- optionally performing a thermal stress relieving on the helical spring.

The steel wire rod comprises a steel alloy. The steel alloy consists out of between 0.8 and 0.95 wt % carbon; between 0.2 and 0.9 wt % manganese; between 0.1 and 1.4 wt % silicon; optionally one or more than one of the micro-alloying elements chromium, vanadium, tungsten, molybdenum, niobium; optionally boron; optionally aluminum; unavoidable impurities; and the balance being iron. The microstructure of the steel core in the helically coiled coated steel wire is drawn lamellar pearlite.

Preferably, the drawing operation results in a coated steel wire having tensile strength $R_m$ (in MPa) higher than the value calculated by the formula: 2680-390.71*ln(d). More preferably, the drawing results in a coated steel wire with tensile strength $R_m$ (in MPa) higher than the value calculated by the formula 2720-390.71*ln(d); more preferably higher than the value calculated by the formula 2770-390.71*ln(d); and even more preferably higher than the value calculated by the formula 2800-390.71*ln(d). With the function "ln(d)" is meant the natural logarithm of the diameter d (in mm) of the coated steel wire. The tensile test to measure the mechanical properties of the steel wires is conducted according to ISO 6892-1:2009 entitled "Metallic materials—Tensile testing—Part 1: Method of test at room temperature".

The patenting step to obtain a pearlitic microstructure can be performed on the wire rod or on a steel wire drawn from the wire rod. The patenting step can be performed as an inline step in the wire rod production process, e.g. via direct in-line patenting. The patenting step can also be performed on the wire rod or on a steel wire drawn from the wire rod via known patenting technologies using either appropriate molten metals baths (such as Pb) or alternatives like fluidized bed, molten salts and aqueous polymers. Prior to wire drawing, a pickling and wire coating step can be performed.

Preferably, the method of making the helical compression spring comprises the step of thermally stress relieving the helical compression spring after coiling it. More preferably, the thermal stress relieving heat treatment step is performed at a temperature below 450° C. on the helical compression spring after its formation. More preferably, the stress relieving heat treatment step is performed at a temperature below 300° C., more preferably below 250° C.

Optionally, other process steps can be applied to the helical compression spring after stress relieving, e.g. hot setting or multiple cold setting. With hot setting is meant that the spring is kept at an elevated temperature in compressed state during some time. With cold setting is meant that the spring is compressed for a number of cycles at room temperature. Such setting operations enable the spring to achieve more strict limited spring relaxation requirements.

BRIEF DESCRIPTION OF FIGURES IN THE DRAWINGS

MODE(S) FOR CARRYING OUT THE INVENTION

Figure 1:
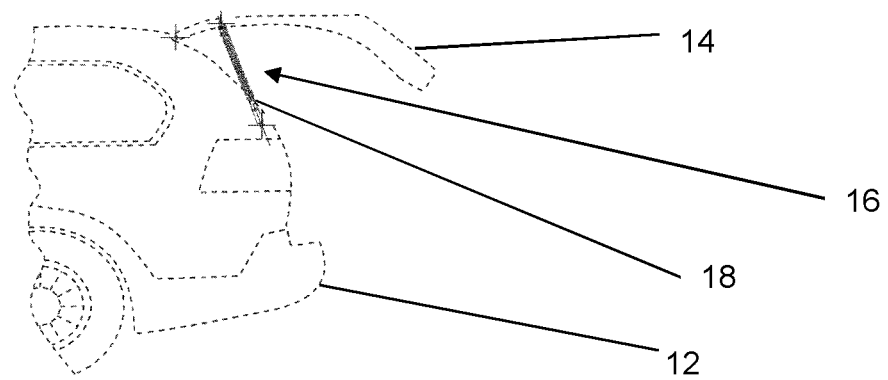
FIG. 1 shows an SUV comprising an actuator for opening and closing its tailgate.
Figure 2:
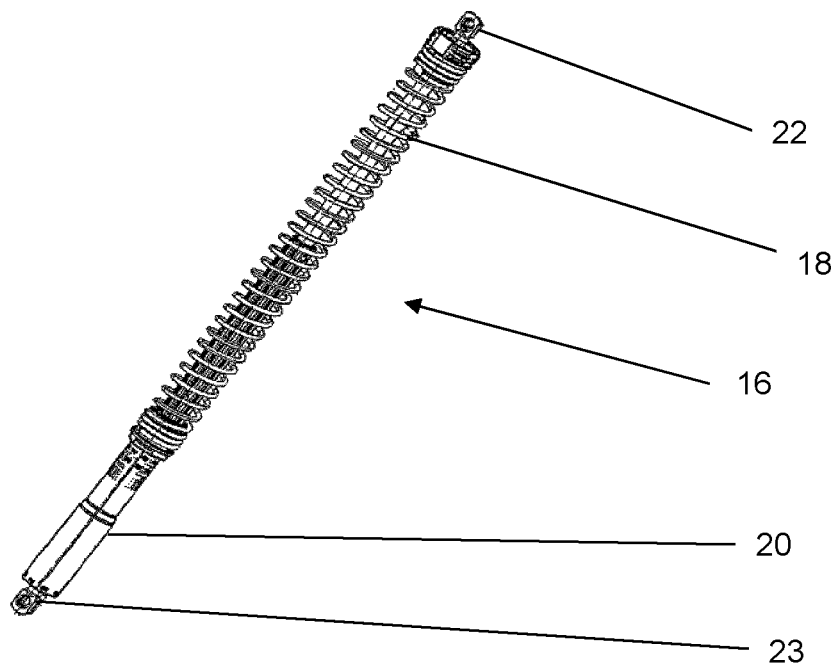
FIG. 2 shows an actuator for opening and closing a tailgate of a car.
Figure 3:
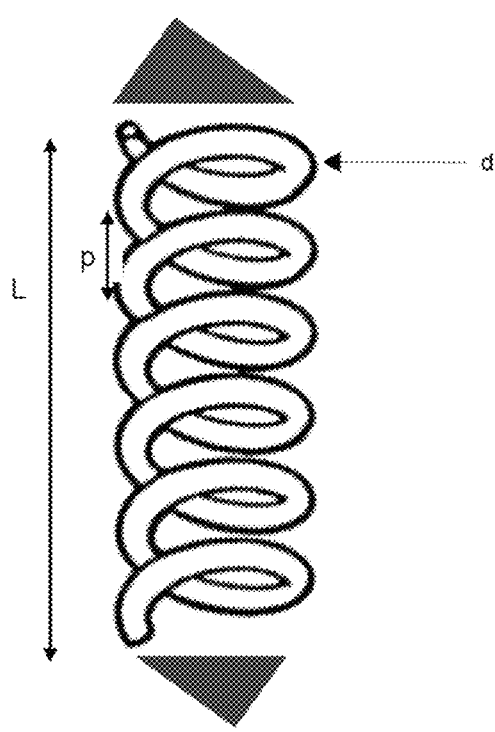
FIG. 3 shows a helical compression spring as in the invention.

FIG. 1 shows an SUV 12 comprising a tailgate 14 and an actuator 16 for opening and closing the tailgate. The actuator (FIG. 2 shows the actuator 16 for opening and closing the tailgate of a car) comprises a helical compression spring 18 and a motor 20. The actuator comprises two connectors 22, 23, one for connecting the actuator to the door or to the tailgate; and the other one for connecting the system to the body of the car. The helical compression spring is provided for opening the tailgate when compressive forces of the helical compression spring are released. The motor is provided for compressing the helical compression spring in order to close the tailgate. An example of a helical compression spring that can be used is shown in FIG. 3, such spring has a length L and a pitch p.

The helical compression spring comprises a helically coiled coated steel wire. The diameter d (in mm) of the helically coiled coated steel wire is preferably between 2 and 5 mm. The helically coiled coated steel wire comprises a steel core and a metallic coating layer.

The steel core comprises a steel alloy; comprising and preferably consisting out of between 0.8 and 0.95 wt % carbon, between 0.2 and 0.9 wt % manganese; between 0.1 and 1.4 wt % silicon; optionally at least one or more than one of the micro-alloying elements chromium, vanadium, tungsten, molybdenum, niobium or boron; optionally aluminum; unavoidable impurities; and iron.

Table I provides specific examples of steel alloys (with minimum and maximum wt % of the elements in the steel alloy) that can be used in the invention for the steel core.

The microstructure of the steel core in the helically coiled coated steel wire is drawn lamellar pearlite.

TABLE I

Examples of steel alloys that can be used in the invention.

| | C (wt %) | | Mn (wt %) | | Si (wt %) | | Cr (wt %) | | V (wt %) | | Al (wt %) | |
|---|---|---|---|---|---|---|---|---|---|---|---|---|
| Alloy | min | max | min | max | min | max | min | max | min | max | min | max |
| A | 0.84 | 0.88 | 0.60 | 0.70 | 0.15 | 0.35 | 0.20 | 0.30 | 0.04 | 0.09 | 0.02 | 0.06 |
| B | 0.84 | 0.88 | 0.60 | 0.70 | 0.60 | 0.80 | 0.20 | 0.30 | 0.04 | 0.09 | 0.02 | 0.06 |
| C | 0.80 | 0.84 | 0.70 | 0.85 | 0.15 | 0.35 | 0.20 | 0.30 | 0.05 | 0.08 | 0.02 | 0.06 |
| D | 0.90 | 0.95 | 0.25 | 0.45 | 0.15 | 0.30 | 0.15 | 0.30 | | | | 0.01 |
| E | 0.90 | 0.95 | 0.25 | 0.45 | 1.10 | 1.30 | 0.15 | 0.30 | | | | 0.01 |
| F | 0.80 | 0.85 | 0.60 | 0.90 | 0.80 | 1.00 | | | | | | |
| G | 0.85 | 0.90 | 0.60 | 0.90 | 0.80 | 1.00 | | | | | | |
| H | 0.90 | 0.95 | 0.30 | 0.60 | 1.10 | 1.30 | 0.20 | 0.40 | | | | |
| I | 0.90 | 0.95 | 0.30 | 0.60 | 1.10 | 1.30 | 0.20 | 0.40 | | | | 0.04 |
| K | 0.84 | 0.88 | 0.65 | 0.85 | 0.80 | 1.00 | | | | | | |
| L | 0.88 | 0.94 | 0.35 | 0.55 | 1.10 | 1.30 | 0.20 | 0.30 | | | | |
| M | 0.90 | 0.94 | 0.35 | 0.55 | 1.20 | 1.40 | 0.20 | 0.40 | | | | |
| N | 0.85 | 0.90 | 0.60 | 0.70 | 0.15 | 0.35 | 0.20 | 0.30 | 0.04 | 0.08 | 0.02 | 0.06 |

A specific example of such helical compression spring has been coiled with a coated steel wire the steel core of which having a drawn pearlitic microstructure and 3.4 mm diameter. The helical compression spring has a length L 0.8 m in unloaded condition. The spring index of the exemplary helical spring is 6.5. The pitch p of the spring is 15.2 mm. The outer diameter of the helical compression spring is 26.8 mm.

In order to manufacture the coated steel wire used for coiling the helical compression spring, a steel wire rod of 10 mm diameter was used.

The steel wire rod was out of a steel alloy consisting out of 0.86 wt % C, 0.63 wt % Mn, 0.2 wt % Si, 0.22 wt % Cr, 0.06 wt % V; 0.04 wt % Al; unavoidable impurities and the balance being iron. This is an alloy of composition "A" of table I. The carbon equivalent is: 0.86+(0.63/6)+(0.2/5)+(0.22/5)+(0.06/5)=1.169.

The 10 mm diameter steel wire rod has been patented to provide it with a pearlitic microstructure; and has then been provided with a metallic coating via hot dip. The hot dip process used was a double dip process in which the steel wire was first dipped in a bath of molten zinc; followed by dipping the steel wire in a bath comprising 10% by weight of aluminum, and the remainder being zinc. The metallic coating layer of the hot dipped steel wire consisted of 10 wt % aluminum and the balance being zinc.

The patented—and hot dipped—wire rod of 10 mm diameter has been drawn to a steel wire of 3.4 mm diameter; this means that a drawing reduction of 88.4% has been applied. The resulting steel wire has a drawn pearlitic microstructure. The tensile strength Rm of the coated steel wire is 2354 MPa; the Rp0.2 value is 1990 MPa, which is 84.5% of the Rm value. The percentage reduction of area Z at break in tensile testing of the steel wire is 44.1%.

The metallic coating on the drawn wire of 3.4 mm was 45 g/m².

After coiling this coated steel wire into a helical compression spring a thermal stress relieving operation was performed, by keeping the helical compression spring in unloaded condition at 250° C. during 30 minutes.

The coated steel wire of the helical compression spring comprised an intermetallic coating layer between the steel core and the metallic coating layer. The intermetallic coating layer provided 45% of the combined thickness of the intermetallic coating layer and the metallic coating layer. The intermetallic coating layer comprised a $Fe_xAl_y$ phase. It has been observed that the metallic coating layer comprised a globularized aluminum rich phase.

Samples of the coated steel wire used for making the helical spring have been subject to a thermal treatment in an oven during 30 minutes at an oven temperature of 250° C. After this thermal treatment, tensile testing has been performed on the coated steel wire sample: the tensile strength Rm is 2426 MPa; the Rp0.2 value is 2366 MPa, which is 97.5% of the tensile strength Rm; and the percentage reduction of area Z at break was 42%.

Analysis of the steel core of the helical compression spring has shown that the steel core has a drawn pearlite microstructure, with more than 97% by volume of drawn pearlite and about 1% by volume of bainite.

The helical compression spring was used in an actuator for opening and closing a tailgate of a car. The metallic coating of the coated steel wire provided the surface of the helical compression spring.

The invention claimed is:

1. An actuator for opening and closing a door or a tailgate of a car, comprising
   a helical compression spring, for opening the door or the tailgate of the car when compressive forces of the helical compression spring are released; and
   a motor, for compressing the helical compression spring in order to close the door or the tailgate of the car,
   wherein the helical compression spring comprises a helically coiled coated steel wire,
   wherein the helically coiled coated steel wire comprises a steel core, a metallic coating layer, and an intermetallic coating layer provided between the steel core and the metallic coating layer,
   wherein the intermetallic coating layer comprises an $Fe_xAl_y$ phase, and
   wherein the intermetallic coating layer provides between 30 and 65% of a combined thickness of the intermetallic coating layer and the metallic coating layer,
   wherein the steel core comprises a steel alloy,
   wherein the steel alloy comprises
      between 0.8 and 0.95 wt % carbon,
      between 0.2 and 0.9 wt % manganese,
      between 0.1 and 1.4 wt % silicon,
      optionally one or more than one of micro-alloying elements selected from the group consisting of chromium, vanadium, tungsten, molybdenum, niobium, and boron;

optionally aluminum,
unavoidable impurities,
and iron,
wherein the steel core has a drawn lamellar pearlite microstructure, and
wherein the metallic coating layer comprises aluminum and at least 84% by mass of zinc.

2. The actuator according to claim 1, wherein the metallic coating layer provides the surface of the helical compression spring.

3. The actuator according to claim 1, wherein the metallic coating layer comprises
zinc,
at least 4% by weight of aluminum,
optionally between 0.2 and 2 wt % magnesium,
optionally up to 0.6 wt % silicon,
optionally up to 0.1 wt % rare earth elements, and
unavoidable impurities.

4. The actuator according to claim 1, wherein the metallic coating layer consists of
zinc,
between 3 and 8 wt % aluminum,
between 0.2-2 wt % magnesium, and
unavoidable impurities.

5. The actuator according to claim 1, wherein the metallic coating layer comprises
between 86 and 92 wt % Zn,
between 8 and 14 wt % Al, and
unavoidable impurities.

6. The actuator according to claim 1, wherein the metallic coating layer consists of
zinc,
between 3 and 8 wt % aluminum,
optionally up to 0.1 wt % rare earth elements, and
unavoidable impurities.

7. The actuator according to claim 1, wherein a mass of the metallic coating layer is between 20 and 80 g/m$^2$.

8. The actuator according to claim 1, wherein the metallic coating layer comprises aluminum and a globularized aluminum rich phase.

9. The actuator according to claim 1, wherein the metallic coating layer consists of zinc and unavoidable impurities, and wherein a mass of the metallic coating layer is more than 80 g/m$^2$.

10. The actuator according to claim 1, wherein the steel alloy has a carbon equivalent higher than 1, wherein the carbon equivalent is defined as: C wt %+(Mn wt %/6)+(Si wt %/5)+(Cr wt %/5)+(V wt %/5)+(W wt %/5)+(Mo wt %/5)+(Nb wt %/5).

11. The actuator according to claim 1, wherein the steel alloy comprises at least one or more than one of the micro-alloying elements, vanadium, tungsten, molybdenum, niobium in individual quantities between 0.04 and 0.2 wt %; and/or comprises chromium in quantities between 0.15 and 0.4 wt %, and/or comprises between 0.0005 and 0.008 wt % boron.

12. The actuator according to claim 1, wherein the microstructure of the steel core in the helical compression spring comprises more than 97% by volume of drawn lamellar pearlite.

13. The actuator according to claim 1, wherein the steel alloy comprises between 0.02 and 0.06 wt % Al.

14. The actuator according to claim 2, wherein the metallic coating layer consists of
zinc,
between 3 and 8 wt % aluminum,
between 0.2-2 wt % magnesium, and
unavoidable impurities.

15. The actuator according to claim 2, wherein the metallic coating layer comprises between 86 and 92 wt % Zn and between 8 and 14 wt % Al, and unavoidable impurities.

16. The actuator according to claim 2, wherein the metallic coating layer consists of
zinc,
between 3 and 8 wt % aluminum,
optionally up to 0.1 wt % rare earth elements, and
unavoidable impurities.

17. An actuator for opening and closing a door or a tailgate of a car, comprising
a helical compression spring, for opening the door or the tailgate of the car when compressive forces of the helical compression spring are released; and
a motor, for compressing the helical compression spring in order to close the door or the tailgate of the car,
wherein the helical compression spring comprises a helically coiled coated steel wire,
wherein the helically coiled coated steel wire comprises a steel core, a metallic coating layer, and an inhibition layer,
wherein the inhibition layer is provided between the steel core and the metallic coating layer,
wherein the inhibition layer is provided by an Fe$_x$Al$_y$ phase; and
wherein the inhibition layer is less than 1 µm thick,
wherein the steel core comprises a steel alloy,
wherein the steel alloy comprises
between 0.8 and 0.95 wt % carbon,
between 0.2 and 0.9 wt % manganese,
between 0.1 and 1.4 wt % silicon,
optionally one or more than one of micro-alloying elements selected from the group consisting of chromium, vanadium, tungsten, molybdenum, niobium, and boron;
optionally aluminum,
unavoidable impurities,
and iron,
wherein the steel core has a drawn lamellar pearlite microstructure, and
wherein the metallic coating layer comprises aluminum and at least 84% by mass of zinc.

18. The actuator according to claim 17, wherein the metallic coating layer comprises
zinc,
at least 4% by weight of aluminum,
optionally between 0.2 and 2 wt % magnesium,
optionally up to 0.6 wt % silicon,
optionally up to 0.1 wt % rare earth elements, and
unavoidable impurities.

19. The actuator according to claim 17, wherein the metallic coating layer comprises
between 86 and 92 wt % Zn,
between 8 and 14 wt % Al, and
unavoidable impurities.

* * * * *